(12) United States Patent
Ihara

(10) Patent No.: US 6,810,267 B2
(45) Date of Patent: Oct. 26, 2004

(54) RADIO COMMUNICATION SYSTEM, PRIVATE BRANCH EXCHANGE AND RADIO TERMINAL FOR PLACE OF BUSINESS

(75) Inventor: Takanobu Ihara, Tokyo (JP)

(73) Assignee: NEC Corporation, Tokyo (JP)

( * ) Notice: Subject to any disclaimer, the term of this patent is extended or adjusted under 35 U.S.C. 154(b) by 506 days.

(21) Appl. No.: 09/778,935

(22) Filed: Feb. 8, 2001

(65) Prior Publication Data

US 2001/0027120 A1 Oct. 4, 2001

(30) Foreign Application Priority Data

Feb. 10, 2000 (JP) ........................................ 2000-034133

(51) Int. Cl.⁷ ................................................ H04M 1/00
(52) U.S. Cl. .................... 455/555; 455/554.1; 455/461; 455/417
(58) Field of Search ............................. 455/555, 554.1, 455/554.2, 74.1, 74, 461, 414.1, 413, 436, 438, 445, 417, 414.2, 421

(56) References Cited

U.S. PATENT DOCUMENTS 5,845,211 A * 12/1998 Roach, Jr. ................... 455/436
5,903,833 A * 5/1999 Jonsson et al. .............. 455/417
6,192,240 B1 * 2/2001 Tayloe et al. ................ 455/428
6,360,100 B1 * 3/2002 Grob et al. .................. 455/442

FOREIGN PATENT DOCUMENTS

| JP | 8-019044 | 1/1996 |
| JP | 9-233550 | 9/1997 |
| JP | 9-307650 | 11/1997 |
| JP | 10-136450 | 5/1998 |
| JP | 11-127482 | 5/1999 |

* cited by examiner

Primary Examiner—Nay Maung
Assistant Examiner—Tanmay Lele
(74) Attorney, Agent, or Firm—Foley & Lardner LLP

(57) ABSTRACT

When a radio terminal communicating with a fixed terminal moves out of a service area of one of radio base stations, a connection to the fixed terminal is switched to a connection to another fixed terminal device such as a voice mail device, which is preliminarily assigned by the radio terminal, to realize a call connection of the fixed terminal to thereby make an indirect communication between the radio terminal and the another fixed terminal.

3 Claims, 3 Drawing Sheets

RADIO COMMUNICATION SYSTEM, PRIVATE BRANCH EXCHANGE AND RADIO TERMINAL FOR PLACE OF BUSINESS

CROSS REFERENCE TO RELATED APPLICATIONS

The present invention claims priority from Japanese Patent Application No. 2000-034133 filed Feb. 10, 2000, the contents of which are incorporated herein by reference.

BACKGROUND OF THE INVENTION

1. Field of the Invention

The present invention relates to a radio communication system for use in a place of business and, particularly, to a radio communication system for a place of business, which allows a call to be saved when a radio terminal is moved out of a service area of a radio base station thereof.

2. Description of Related Art

A private telephone service, in which a plurality of base radio stations each having a service area having a diameter in a range from several tens meters to several hundreds meters are arranged outside of a place of business such as factory and a mobile radio terminal is connected to a public telephone network through one of the base radio stations, has been put in practice. Although such private telephone service is similar to the cordless telephone system for home use, it differs from the cordless telephone system in that a telephone number is assigned to not a base radio station corresponding to a subscriber terminal in the cordless telephone system but a radio terminal corresponding to an extension terminal in the same system. Since the service area of the private telephone service is narrow and a usable range of the service can be defined, the private telephone service is suitable for use as a radio communication system in a private area. However, even if it is used in a private area, many locations exist outside the service area, in which communication between the base radio station and the radio terminal becomes impossible due to attenuation or cut-off of electromagnetic wave, so that a call from the public telephone network to radio terminal in such a location and a communication between the network and the radio terminal become impossible.

In order to allow a call from a public telephone network to a radio terminal located outside a service area, in which communication is possible, many proposals have been made. One of them, which is disclosed in JP H9-307650 A, is an automatic transfer system, in which a radio terminal is registered as an extension of a private branch exchange or a terminal of a key station, so that a call from a telephone to the radio terminal can be received by the same radio terminal by using a public telephone number assigned thereto. Another of them, which is disclosed in JP H8-019044 A, is a private automatic exchange system, in which a call is transmitted to a called side by utilizing a public telephone network. Another of them, which is disclosed in JP H10-136450 A, is a private radio communication system, in which a calling side can be easily confirmed by a called side in a case where the called side is out of a service area when the call is received thereby.

In such conventional automatic transfer system, etc., there is a problem that, when a called radio terminal moves to a location outside a service area of a radio base station during a communication with a calling side fixed terminal, the calling side fixed terminal can not continue the communication since a call connection circuit is broken off. Further, in the radio communication system, there is another problem that, when the receiving state of electromagnetic wave in a radio base station is not stable, a discontinuity of communication tends to occur, resulting in an unstable communication state.

In order to continue the communication when a call connection, which is once broken off during a communication between the radio terminal and the other side fixed terminal due to movement of the radio terminal out of the service area, is restored, it is necessary to make a call from the radio terminal or the other side fixed terminal again. However, in order to make the call connection between the radio terminal outside the service area and the other side fixed terminal possible, it is necessary to construct the previously mentioned special system, since there has been no simple system capable of communicating with the radio terminal.

SUMMARY OF THE INVENTION

An object of the present invention is to provide a private radio communication system, a private branch exchange and a radio terminal, with which, when a radio terminal moves out of a service area thereof during a communication between the radio terminal and the other side fixed terminal, a some communication from the other side fixed terminal to the radio terminal can be continued.

Another object of the present invention is to provide a private radio communication system, a private branch exchange and a radio terminal, with which, when the radio terminal moves out of a service area thereof, a call connection of the other side fixed terminal is prevented from being broken off to make a communication of the other side fixed terminal to the radio terminal possible.

A further object of the present invention is to provide a private radio communication system, a private branch exchange and a radio terminal, with which, when the radio terminal moves out of a service area of a radio base station during a communication established between the radio terminal and a fixed terminal, the fixed terminal can be connected to a predetermined fixed terminal device to transfer the communication to the latter fixed terminal device.

In order to achieve the above objects, a private radio communication system according to the present invention, in which a radio terminal is connected to a private branch exchange through a radio base station, is featured by that, when the radio terminal, which is connected to a preliminarily assigned fixed terminal through the radio base station and a private branch exchange, moves out of a service area of the radio base station, the private branch exchange detects a cut-off of a receiving electromagnetic wave from the radio base station and switches the fixed terminal to a predetermined fixed terminal device on the basis of the detection. Further, the private branch exchange is featured by that it holds a connection information between the fixed terminal device and the fixed terminal according to a notice from the radio terminal and the fixed terminal device is a voice mail device or a fixed terminal in a place of business to which a user of the radio terminal belongs.

The private branch exchange according to the present invention, which is used in a private radio communication system for connecting a radio terminal to a fixed terminal through a radio base station, is featured by that the private branch exchange holds a correspondence information between a preliminarily assigned fixed terminal and a preliminarily assigned fixed terminal device and, when the radio terminal, which is connected to the fixed terminal through the radio base station and the private branch exchange, moves out of service areas of all of the radio base stations, switches the fixed terminal to the fixed terminal device. The correspondence information between the fixed terminal and the fixed terminal device is held according to a notice from the radio terminal.

The radio terminal according to the present invention, which is used in a private radio communication system for connecting a radio terminal to a fixed terminal through a radio base station, is featured by that the radio terminal comprises control means, which, when the radio terminal connected to a preliminarily assigned fixed terminal through the radio base station and the private branch exchange moves out of service areas of all of the radio base stations, transmits the correspondence information between the fixed terminal and the fixed terminal device to the private branch exchange such that the fixed terminal is switched to the fixed terminal device, and preliminarily registers the correspondence information in the private branch exchange. Further, the fixed terminal device is a fixed terminal or a voice mail device in a place of business to which a user of the radio terminal belongs.

According to the present invention, when the radio terminal, which is communicating with a fixed terminal through the radio base station, moves out of the service area of the radio base station, the private branch exchange connects the other side fixed terminal to a predetermined fixed terminal device such as a voice mail device to maintain a circuit connection, so that an indirect communication between the radio terminal and the other side fixed terminal becomes possible.

BRIEF DESCRIPTION OF THE DRAWINGS

The above mentioned and other objects, features and advantages of the present invention will become more apparent by reference to the following detailed description of the invention taken in conjunction with the accompanying drawings, in which.

DETAILED DESCRIPTION OF THE PREFERRED EMBODIMENTS

First Embodiment

Construction

Figure 1:
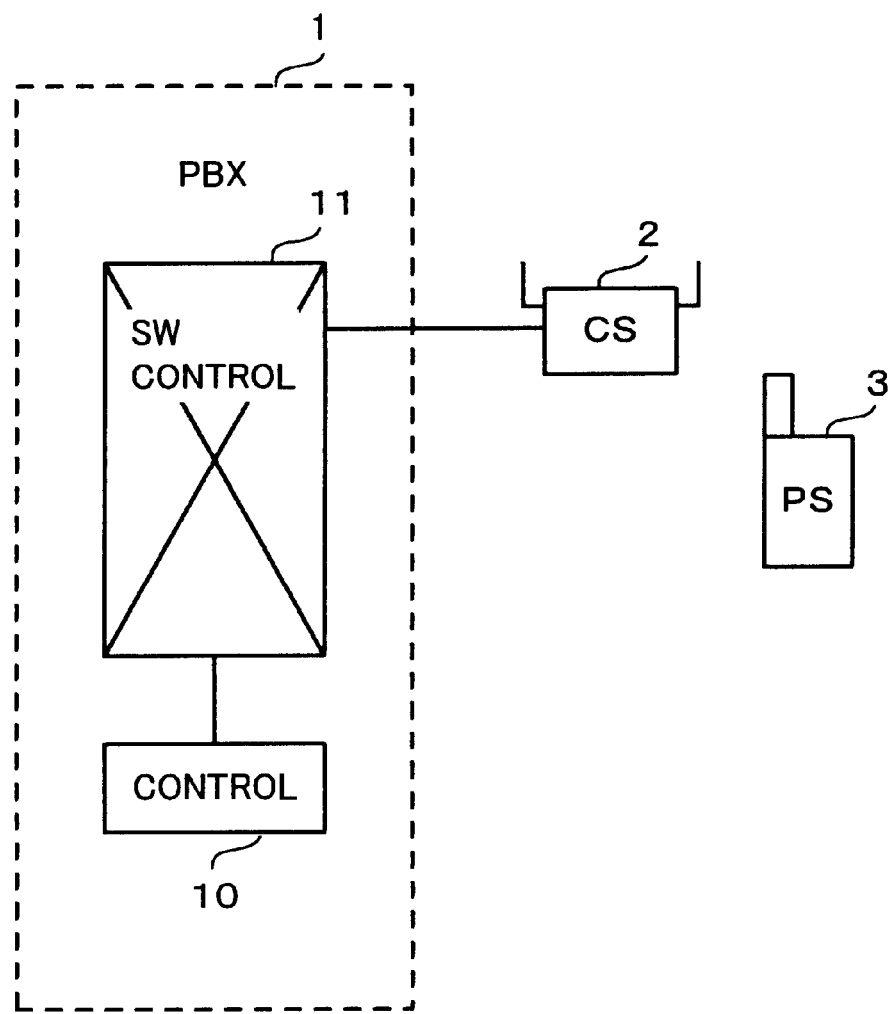
FIG. 1 schematically shows an embodiment of a private radio communication system, a private branch exchange and a radio terminal, according to the present invention.

FIG. 1 is a block diagram showing an embodiment of a private radio communication system, a private branch exchange and a radio terminal, according to the present invention. The embodiment is constructed with a private branch exchange 1, a radio base station (CS) 2, which is one of a plurality of radio base stations, and a radio terminal (PS) 3.

The private branch exchange 1 is composed of a control device 10 and a switch control device 11, and the radio base station 2 and the radio terminal 3 communicate each other through radio wave connection.

Figure 2:
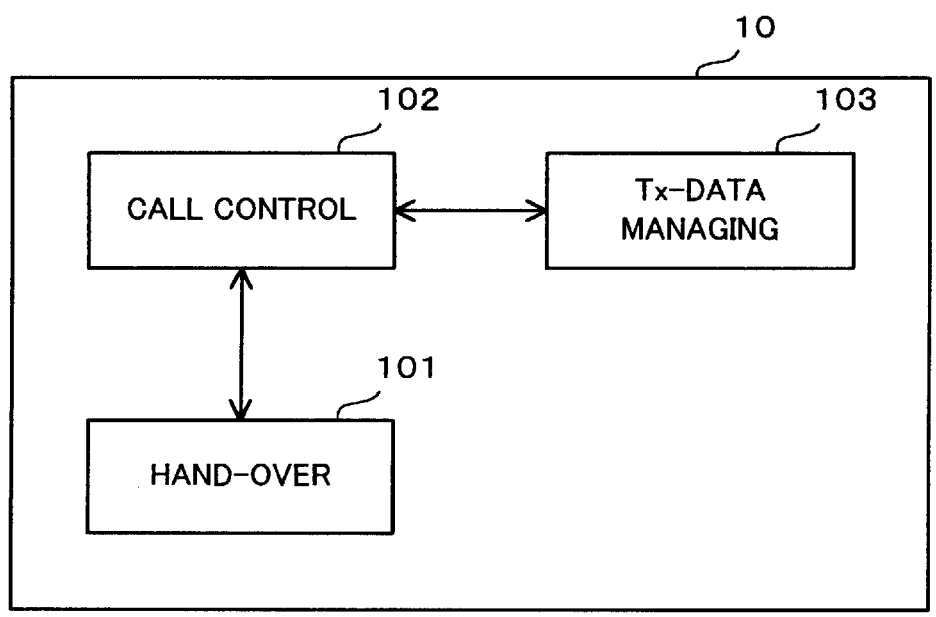
FIG. 2 is a schematic functional block diagram of a control device of the private branch exchange.

FIG. 2 is a functional block diagram of the control device 10 of the private branch exchange 1. The control device 10 is constructed with a hand-over portion 101, a call control portion 102 and a transfer data managing portion 103. The hand-over portion 101 functions to detect a movement of the radio terminal 3 into a service area of another radio base station during a movement of the radio terminal 3 outside the service area of the radio base station 2 and switch the latter radio base station 2, to which the radio terminal 3 was connected, to the another radio base station to make a continuous communication possible therethrough. The transfer data managing portion 103 functions to register (store) an information (registration information) of data to be transferred to the other side fixed terminal with which the radio terminal 3 is communicating presently, as to be described in detail later. The call control portion 102 functions to control a registration management by writing the information in the transfer data managing portion 103, a transfer management by reading the registered information and a processing of the switch control device 11 such as a terminal control.

The radio terminal 3 is connected to the switch control device 11 of the branch exchange 1 through the radio base station 2, to which the radio terminal 3 is connected through radio wave and the switch control device 11 performs a switch control according to an instruction from the control device 10. With the above described construction, the radio terminal 3 can communicate with the other fixed terminal, the call from which is connected thereto through the switch control device 11. The functions of the radio terminal 3, the radio base station 2 and the private branch exchange 1, related to the present invention, will be described in more detail.

The radio terminal 3 includes control means for preliminarily registering a registration information of specific fixed terminals, which includes terminal number data, etc., thereof and to which the service of the present invention is selectively applied, in the private branch exchange 1 through the radio base station 2 according to a control signal input from a key board, etc., of the radio terminal 3 in the on-hook state thereof. The registration information to be registered in the private branch exchange 1 is the transfer data including a set of a terminal number data of the specific fixed terminals and a fixed terminal number data of fixed terminal devices connected to the specific fixed terminals such as voice mail devices or telephone terminals of a place of business to which the user of the radio terminal 3 belongs, etc.

The radio base station 2 transmits the registration information received from the radio terminal 3 to the private branch exchange 1. When electromagnetic wave from the radio terminal 3 can not received by the radio base station 2, the latter decides that the radio terminal 3 was moved to an area out of the service area of the radio base station 2 and transmits a call cut signal requesting a cut-off of the connection circuit to the private branch exchange 1.

The private branch exchange 1 functions to register the registration information of the radio terminal 3, which is transmitted from the radio base station 2 as the transfer data, by writing the latter in the transfer data managing portion 103 through the call control portion 102 shown in FIG. 2. Further, the control device 10 of the private branch exchange 1 functions, when the private branch exchange 1 receives the call cut-off signal for the radio terminal 3 transmitted from the radio base station 2, to determine whether or not another radio base station capable of receiving the electromagnetic wave transmitted from the radio terminal 3 exists and, if exists, perform a hand-over processing to the another radio base station. Further, when the another radio base station can not receive the electromagnetic wave from the radio terminal 3, the call control portion 102 searches the transfer data managing portion 103 for a transfer data related to a fixed terminal device, which is a destination terminal to be connected to the radio terminal 3, therein. When there is the transfer data of the destination terminal in the transfer data managing portion 103, the private branch exchange 1 connects the fixed terminal, which is connected to the radio terminal 3, to a fixed terminal device indicated by the transfer data according to the call cut-off signal. When there is no transfer data in the transfer data managing portion 103, the private branch exchange 1 cuts off the connection circuit.

Operation

Now, an operation of the private radio communication, the private branch exchange and the radio terminal, according to the present invention will be described.

The radio station 3 preliminarily registers transfer data related to specific fixed terminals in the private branch exchange 1 as fixed terminals to which the transfer service of the present invention is applied.

When the radio terminal 3, which preliminarily registers the transfer data in the private branch exchange 1 and is presently communicating with one of the registered fixed terminals in the service area of the radio base station 2, moves into an area out of the service area, such as a room of a building, a basement thereof, a sealed building or a tunnel, the electromagnetic wave from the radio terminal 3 is extinct, with which the outside movement of the radio terminal 3 is detected by the radio base station 2. As a result, the radio base station 2 transmits the call cut-off signal containing an identifier indicating the movement of the radio terminal 3 out of the service area of the radio base station 2 to the control device 10 of the private branch exchange 1 and requests the control device 10 of the private branch exchange 1 to cut off the connected circuit between the radio terminal 3 and the radio base station 2.

In response to the call cut-off signal from the radio base station 2, the hand-over portion 101 of the control device 10 of the private branch exchange 1 monitors signals from other radio base stations than the radio base station 2 to confirm whether or not the electromagnetic wave from the radio terminal 3 is being received by the other radio base station. When the other radio base station can receive the electromagnetic wave from the radio terminal 3, the private branch exchange 1 performs the hand-over processing to the other radio base station, that is, an exchange processing for controlling the switch control device 11 such that the communication between the radio terminal 3 and the radio base station 2 is continued through the other radio base station.

Further, in response to the identifier and the call cut-off signal received by the call control portion 102 of the control device 10, the private branch exchange 1 searches the transfer data managing portion 103 for a transfer data such as a terminal number data of a fixed terminal device, which is registered by the radio terminal 3 and is a destination terminal. When there is the transfer data in the transfer data managing portion 103, the private branch exchange 1 reads the registered transfer data and executes a call processing for connecting the fixed terminal of the other side, which was connected to the radio terminal 3. On the other hand, when there is no transfer data in the transfer data managing portion 103, the private branch exchange 1 cuts off the circuit connection between the radio terminal 3 and the fixed terminal.

Figure 3:
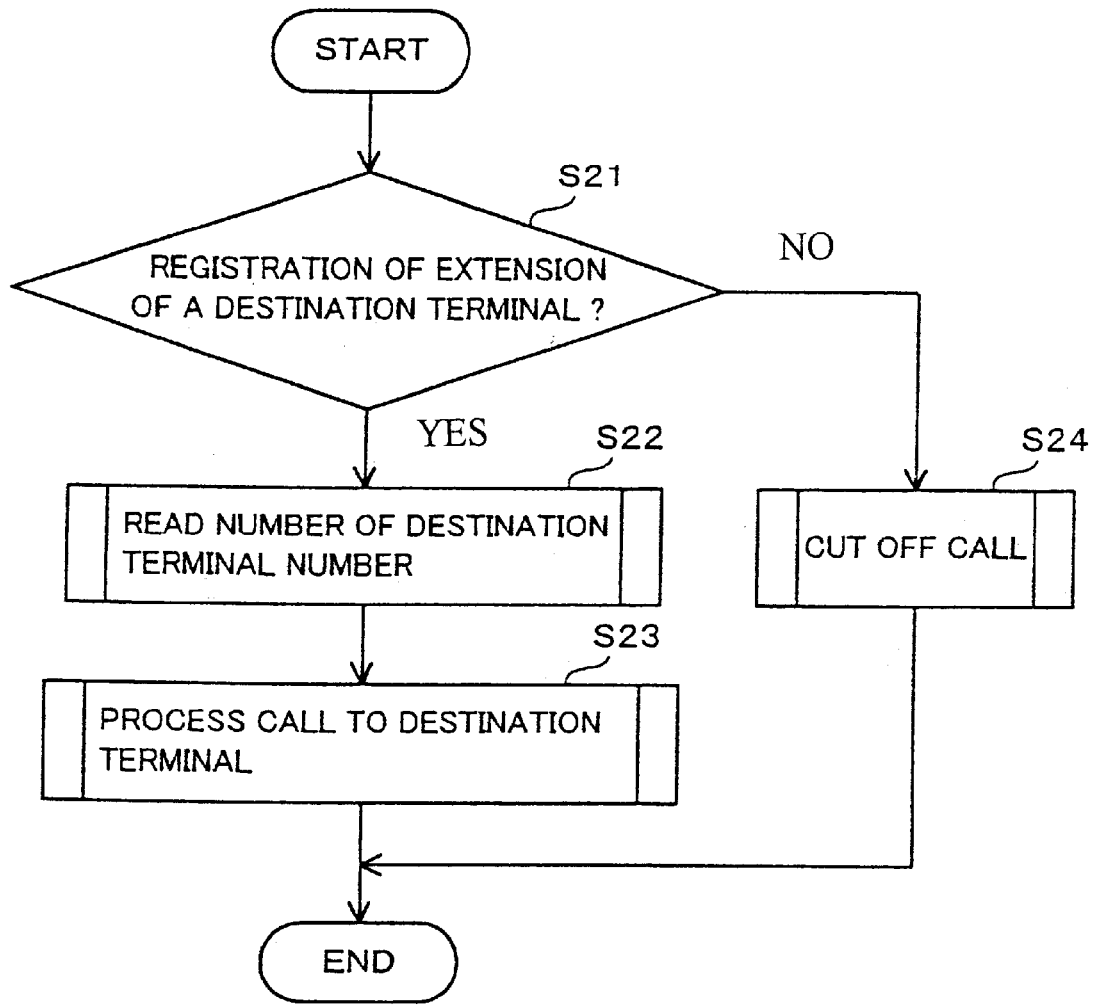
FIG. 3 is a flowchart showing a processing performed in a call control portion when a radio terminal, which is communicating with a fixed terminal, moves out of a service area.

FIG. 3 is a flowchart showing an operation of the call control portion 102 when the radio terminal 3 communicating with the other side moves out of the service area. When it is determined by the search result of the transfer data managing portion 103 performed by the call control portion 102 that there is a registration of such as extension of the destination terminal (S21), the call control portion 102 reads the number data of the destination terminal from the transfer data managing portion 103 (S22) and performs the call processing to the destination terminal (S23). When there is no registration of such as extension of the destination terminal (S21), the call control portion 102 restores the call connection between the radio terminal 3 and the fixed terminal of the other side (S24).

When the call processing to the predetermined fixed terminal device is executed in this manner, the destination fixed terminal rings and an extension, etc., thereof responds to the call, so that the call connection between the radio terminal 3 and the destination fixed terminal is switched to a connection between the destination fixed terminal and the transferred fixed terminal device. Therefore, the communication of the other side fixed terminal is kept continued. Thereafter, by sending an information of communication, which is a continuance of the communication between the user of the radio terminal 3 and the destination fixed terminal, to a person who is in the place of business to which the user of the radio terminal 3 belongs or to the voice mail device of the fixed terminal device, the other side of the communication can continue the communication. Further, the user of the radio terminal 3 can take the continuance information from the voice mail device or the person in the place of business to which the user of the radio terminal 3 belongs after the radio terminal 3 moves back to the service area, although the circuit connection is cut off once.

The switching operation described above is performed when the radio terminal 3 moves out of service areas of all of the radio base stations. In a case where one of the radio base stations, which is other than the radio base station 2, can receive the electromagnetic wave from the radio terminal 3, the connection between the radio terminal 3 and the other side of the communication is performed through the one radio base station. Therefore, it is possible, needless to say, to continue the communication.

Other Embodiments

In the described embodiment, a key number of the voice mail device or the place of business to which the user of the radio terminal belongs is registered as a transfer destination of the other side fixed terminal when the radio terminal moves out of the service area. In a case of instantaneous cut-off of electromagnetic wave caused by a movement of the radio terminal from and then back to the service area, which is performed within a short time, it is possible to register a number data of a fixed terminal of the radio terminal itself as the transfer destination. In such case, the private branch exchange 1 responds to a call cut-off signal from the radio base station to perform the call processing to the radio terminal, which moved out of the service area, again. When the timing of the call processing coincides with the moving of the radio terminal back to the service area, it is possible to shift again to the communication state to thereby continue the communication.

Further, in the described embodiment, the fixed terminals to which the present service is applied are preliminarily registered by the radio terminal. However, it is possible to construct the present radio communication system such that this registration is performed on demand during a communication between the radio terminal and a predetermined fixed terminal. In such case, the radio terminal 3 transmits a control signal to the radio base station, depending upon a situation, the other side of communication or a content of the communication, for which a movement of the radio terminal 3 out of the service area during the communication is anticipated, and a terminal number data of a fixed terminal device to which the other side fixed terminal is connected during communication is registered in the private branch exchange 1.

According to the present invention, when a radio terminal communicating with a fixed terminal moves out of a service area of a related radio base station, the fixed terminal is switched such that the radio terminal is connected to a preliminarily set fixed terminal device to transfer a call connection of the fixed terminal to the preliminarily set fixed terminal device. Therefore, the fixed terminal can continue the communication with the fixed terminal device without restoration of connection circuit. Therefore, the communication related to the radio terminal can continue and an indirect communication between the radio terminal becomes possible.

According to the radio terminal according to the present invention, it is possible, in order to prevent a communication circuit between the radio terminal and a fixed terminal from being cut off, to preliminarily register an information, such as number data, of a fixed terminal device to be connected to the fixed terminal in a private branch exchange. Therefore, the fixed terminal assigning the fixed terminal device can avoid a breakage of the circuit between the fixed terminal and the radio terminal.

By using a voice mail device or a telephone terminal having a number such as a key telephone number of a place of business, to which a user of the radio terminal belongs, as the fixed terminal device, a user of the fixed terminal, who is communicating with the radio terminal, can continue the communication when the radio terminal moves out of its service area, by getting an information of the continuance of the communication, which is a portion of the communication after the connection between the radio terminal and the fixed terminal is cut out, as a message on the voice mail device or as an information from a responder of the telephone terminal. Further, the user of the radio terminal 3 moving out of the service area can get a necessary information on the voice mail device or from an information from the responder after it moves back to the service area, although the connection circuit between the radio terminal and the fixed terminal is cut out instantaneously.

What is claimed is:

1. A private radio communication system comprising a mobile radio terminal, a plurality of radio base stations and a private branch exchange, said mobile radio terminal being connected to said private branch exchange through one of said radio base stations, wherein, when said radio terminal connected to a preliminarily assigned fixed terminal through said radio base station and said private branch exchange moves out of service areas of all of said radio base stations, said private branch exchange switches the connection of an ongoing call of said radio terminal to said preliminarily assigned fixed terminal to a connection to a predetermined fixed terminal device on a basis of a call cut-off signal generated by said base radio station upon a detection of disappearance of a receiving electromagnetic wave from said radio terminal, wherein the ongoing call includes speech signals of a callee using said mobile radio terminal and a caller using said preliminarily assigned fixed terminal, wherein said mobile radio terminal includes means for outputting a control signal to said one of said radio base stations to instruct said one of said radio base stations to provide information included in said control signal to said private branch exchange, and wherein said information included in said control signal includes correspondence information between said mobile radio terminal and said predetermined fixed terminal device that is to receive said ongoing call and to thereby continue a call in an event that the call cut-off signal is generated during said ongoing call.

2. A private radio communication system comprising a mobile radio terminal, a plurality of radio base stations and a private branch exchange, said mobile radio terminal being connected to said private branch exchange through one of said radio base stations, wherein, when said radio terminal connected to a preliminarily assigned fixed terminal through said radio base station and said private branch exchange moves out of service areas of all of said radio base stations, said private branch exchange switches the connection of an ongoing call of said radio terminal to said preliminarily assigned fixed terminal to a connection to a predetermined fixed terminal device on a basis of a call cut-off signal generated by said base radio station upon a detection of disappearance of a receiving electromagnetic wave from said radio terminal, wherein the ongoing call includes speech signals of a callee using said mobile radio terminal and a caller using said preliminarily assigned fixed terminal, wherein said private radio communication system is configured to switch the ongoing call between said predetermined fixed terminal device and said preliminarily assigned fixed terminal to said mobile radio terminal and said preliminary assigned fixed terminal at a predetermined time after the ongoing call was switched from said mobile radio terminal to said predetermined fixed terminal device.

3. A radio terminal as claimed in claim 2, wherein, in a case where said mobile radio terminal cannot communicate with any of said radio base stations at a time when the private radio communication system switches the ongoing call, the ongoing call is cut-off.

* * * * *